A. KAISER.
2 Sheets—Sheet 1.
DIFFERENTIAL PRESSURE VALVE.
No. 10,645.
Reissued Sept. 22, 1885.
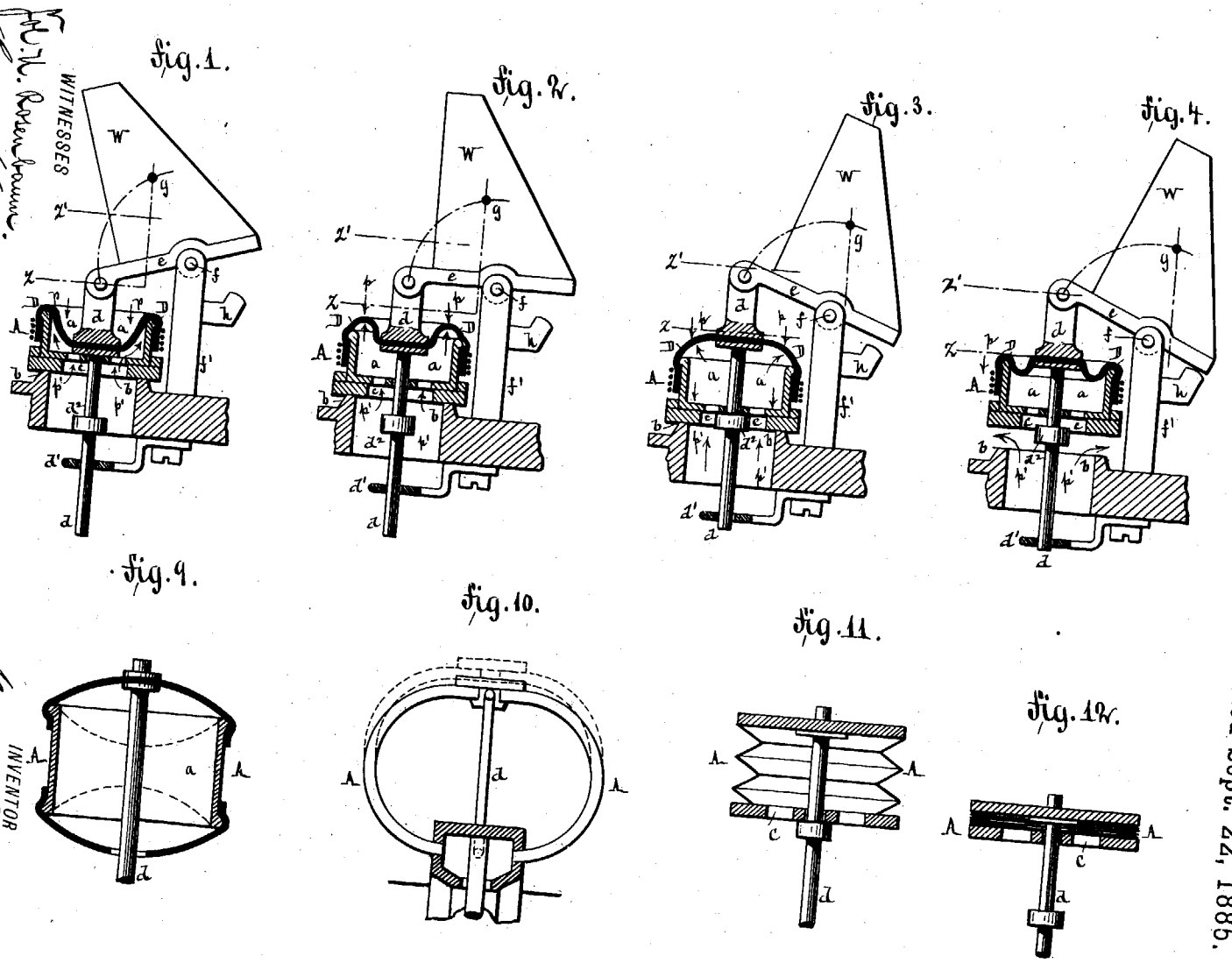
WITNESSES
F. H. H. Rosenbaum.
Carl Keck
INVENTOR
Alexander Kaiser
By his Attorneys
Goepel & Raegener
N. PETERS, Photo-Lithographer, Washington, D. C.

2 Sheets—Sheet 2.
A. KAISER.
DIFFERENTIAL PRESSURE VALVE.
No. 10,645. Reissued Sept. 22, 1885.
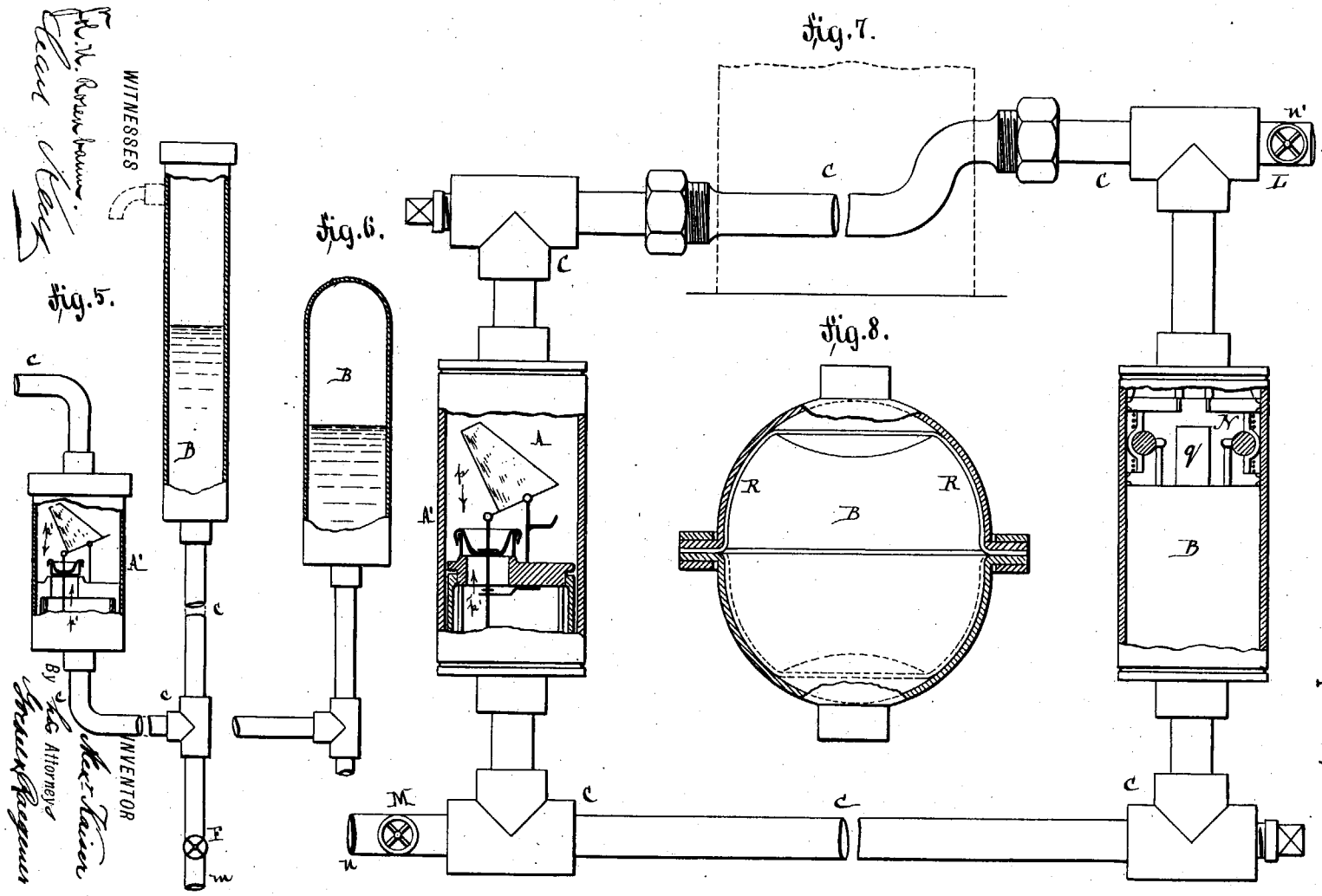
N. PETERS. Photo-Lithographer, Washington, D. C.

UNITED STATES PATENT OFFICE.

ALEXANDER KAISER, OF FREIBURG, SWITZERLAND.

DIFFERENTIAL-PRESSURE VALVE.

SPECIFICATION forming part of Reissued Letters Patent No. 10,645, dated September 22, 1885.

Original No. 313,080, dated March 3, 1885. Application for reissue filed June 19, 1885. Patented in England September 27, 1883, No. 4,599; in Belgium September 29, 1883, No. 62,618; in Sweden November 16, 1883; in Austria-Hungary December 10, 1883, No. 36,269, and No. 53,441; in France December 18, 1883, No. 157,494; in Germany December 21, 1883, No. 27,405, and in Norway December 21, 1883.

*To all whom it may concern:*

Be it known that I, ALEXANDER KAISER, of Freiburg, in the Republic of Switzerland, have invented certain new and useful Improvements in Differential-Pressure Valves, of which the following is a specification.

The object of my invention is to furnish a valve by which the flow of liquids or gases from or through a conduit is regulated in such a manner that it shall be intermittent between certain limits of differences of pressure.

For this purpose the invention consists of a valve of special construction which automatically controls the flow of liquids or gases at a fixed difference of pressure, in connection with a receiver and connecting-pipes. The valve is provided with a flexible diaphragm and with a valve-spindle, to which a weighted balance-lever is attached, by which a certain play of the diaphragm is permitted before the valve is opened for the passage of the liquids or gases, as will appear more fully hereinafter, and finally be pointed out in the claims.

In the annexed drawings, Figures 1 to 4 represent my improved differential-pressure valve, showing it in different positions. Fig. 5 shows the valve connected with the conduit and with an open storage-chamber or receiver. Fig. 6 shows a closed storage-chamber. Fig. 7 shows my improved valve combined with a conduit and a storage-chamber with loaded piston; Fig. 8, a loaded membrane within the storage-chamber, and Figs. 9 to 12 are modifications of the valve-body.

Similar letters of reference indicate corresponding parts.

In the drawings, A represents my improved valve, which belongs to that class of valves which are automatically opened or closed by the difference of pressure on opposite sides thereof. The valve is represented in detail in Figs. 1 to 4, in which *b* is the valve-seat; *a*, the cup-shaped valve-body, which has one or more openings, *c*, in its bottom. The valve *a* is closed at the top by a flexible diaphragm, D, to the center of which the valve-spindle *d* is attached in any suitable manner. The valve-spindle *d* is guided in its up-and-down motion by a central opening of the valve-bottom and by a guide-piece, *d'*, below the same. A fixed collar, $d^2$, of the valve-spindle *d* serves to raise the valve *a* from its seat when abutting against its bottom. By means of the flexible diaphragm the spindle *d* is free to move through a fixed distance (marked *z z'* in the drawings) before the valve is opened. The upper end of the valve-spindle is pivoted to a lever, *e*, that is fulcrumed at *f* to a support, *f'*. This lever is loaded with a balance-weight, W, the center of gravity of which is at *g*, Fig. 1, and which is so located thereon that when the valve-spindle arrives near the end of its upward motion the center of gravity of the balance-weight W is thrown to the other side of a vertical plane passing through the axis *f* of the lever *e*. A fixed stop, *h*, of the support *f'* prevents the weighted lever *e* from being thrown too far beyond the center. The combined weight of the valve *a*, valve-spindle *d*, and lever *e* is much smaller than the balance-weight, so that the same acts quickly on the parts mentioned whenever the center of gravity of the balance-weight W has passed to one side or the other of the axis of the lever *e*.

The operation of the valve A is as follows: When the pressure *p* above the valve *a* is equal to the pressure *p'* below the same, the parts take the positions shown in Fig. 1; but as soon as the difference of pressure above and below corresponds to the normal difference of pressure—that is to say, to the pressure at which a flow through the valve is to take place—the parts will rapidly pass through the positions shown in Figs. 2 and 3, and finally arrive in the position shown in Fig. 4, in which the valve is open and the flow takes place. The parts will so remain until the pressures *p* and *p'* above and below the diaphragm are nearly equal again. The valve *a* will then recede and cause, by its weight and the weight of the valve-spindle, the center of gravity of the weighted lever to be thrown over into the position shown in Fig. 3, in which the valve rests upon the seat. The motion of the weighted lever and valve-spindle *d* continues until the spindle rests upon the bottom of the valve *a*, as shown in Fig. 1, thus exerting the full pressure upon the valve. By the openings in the bottom of the valve *a* the difference of pressures *p′ p* serves to increase the tight fitting of the valve to its seat, as shown in Figs. 2 and 3. The valve can rise still farther even after the spindle has reached its highest position, whereby the sectional area of the discharge-opening is enlarged without causing any loss of pressure.

The construction of the valve may be made in a number of different ways. For instance, the bottom may be formed of flexible material as well as the top, as in Fig. 9; or a rigid hollow valve may be connected with the valve-spindle by means of elastic manometer-tubes, as in Fig. 10; or a bellows-shaped valve may be used, as in Figs. 11 and 12.

The receiver or storage-chamber B, which is used for the storage of liquids or gases until the difference of pressure is reached at which the valve A is to be opened, may be made either of an open vessel supported at such an elevation above the discharge-opening that the pressure of the column of liquid above the discharge-opening has to be reached before the valve A is opened, as in Fig. 5; or a closed air or steam chamber may be used, as in Fig. 6, or a cylinder with a loaded piston, as in Fig. 7, or a vessel with a loaded diaphragm, as in Fig. 8, or any other inclosed space the expansibility of which corresponds to the difference of pressures *p′ p* may be used.

By the co-operation of the storage-chamber B and of the valve A the flow through the pipe C in Fig. 6 is as follows: The end *m* of the pipe C being connected with a water-main, and the stop-cock F being nearly closed, so as to allow but a very small quantity of water to pass through—for instance, one quart a minute—while the capacity of the chamber B between the desired differences of level is ten quarts, the water will be stored in the receiver B for ten minutes, when it will reach the level at which the valve A will be opened, so as to rapidly discharge ten gallons, thereby lowering the water-level sufficiently to allow the valve to be closed again. This arrangement may be used for automatically flushing water-closets or drain-pipes at fixed intervals of time and for other purposes where an intermittent discharge is required.

In Fig. 7, C represents a water-main in which a section of pipe is removed and the connecting-pipes C, with the valve A and storage-chamber B, interposed for the same. The ends *n n′* of the water-main are provided with stop-cocks M and L.

The storage-chamber consists of a cylinder, B, connected at its top and bottom with the conduit-pipes C C, and provided with a loaded plunger, N, or of a spherical vessel, B, (shown in Fig. 8,) which is arranged with a loaded flexible membrane, R. The valve A is inclosed by a cylindrical vessel, A′, which is also connected by the pipes C C to the ends *n n′* of the main.

Assuming the inlet-valve M to be entirely opened, while the outlet-valve is open just far enough to allow the water to drip out, and, further, that the loading of the plunger N or membrane R of the receiver B be smaller than the balance-weight W of the valve A, then the following action will take place: The upper part of the storage-chamber B will be discharged first, according to the opening of the outlet-valve L. As soon as the plunger N or the loaded membrane R arrives at the top of the cylinder or spherical casing, the pressure *p* above the valve A is at once reduced, and the valve A opened by the difference of pressure above and below. The water has now free access to the upper part, and is rapidly transferred from the lower part of the storage-vessel, through the valve A, to the upper part of the pipe C, the valve A being kept open during this circulation, owing to the difference of pressure acting on it, until the plunger or membrane arrives at the bottom of the storage-chamber, when equality of pressure will be re-established and the valve A be closed. During the upward motion of the plunger N the slow discharge of water from the space above the plunger recommences until the same arrives at the top of the storage-chamber, when the valve A is opened again, and the quick discharge of the accumulated water in the storage-chamber will take place. In this manner an intermittent discharge of water is established. This arrangement may be used for measuring the quantity of water passing through the pipes C C, in which case either a rotary water-meter may be introduced, as indicated in dotted lines in Fig. 7, or the storage-receptacle may be used as a measuring-vessel, in which case the plunger or membrane is connected by a transmitting-rod and train of registering-wheels to a suitable dial.

The plunger N may be provided with an air-chamber, *q*, (shown in Fig. 7,) by which the opening of the valve A is accelerated until the weighted plunger gets properly started in its downward motion.

My improved valve may also be used with advantage in connection with rotary water-meters, as thereby the passage even of very small quantities, which would otherwise exert no influence on the meters, can be registered. When the valve is used with a water-meter, it has to be observed that the valve will be entirely opened and thereby out of action whenever the velocity of the water in the conduit-pipes corresponds to the pressure of a column of water which is greater than the difference of pressure for which the valve is constructed. The valve A is only then thrown into action when the pressure is reduced below the difference of pressure for which the valve is constructed, the valve serving then to accumulate the water and discharge it intermittently through the meter when the pressure of the water is strong enough to open the valve A. The valve may also be used for intermittently feeding water to steam-boilers and for other purposes in which an effect is to be produced by the difference of pressure.

Among the advantages of my valve may be mentioned the rapid decrease of the influence of the weighted lever on the valve as soon as the required difference of pressure is reached, the small weight of the valve-spindle and valve-body in proportion to the weight of the fulcrumed accelerating-lever, the position of the center of the gravity of the balance-weight while the flow takes place, all of which insures the reliable and steady functioning of the valve in its different applications.

Having thus described my invention, I claim as new and desire to secure by Letters Patent—

1. A differential-pressure valve consisting of a valve-seat, a valve-body having a bottom opening, a flexible diaphragm, and provided with a collar or lug for engaging the valve-body, attached to the valve-body, a valve-spindle attached to the diaphragm, and a fulcrumed and weighted balance-lever connected to the upper end of the valve-spindle, whereby the same is free to move through a fixed distance before the valve is raised from its seat by the difference of pressure above and below the same, substantially as set forth.

2. A differential-pressure valve composed of a valve-seat, *b*, a valve-body, *a*, provided with an opening in its bottom, a flexible diaphragm, D, connected to the valve-body, a valve-spindle, *d*, connected to the diaphragm and provided with a collar, $d^2$, a fulcrumed lever, *e*, pivoted to the valve-spindle and provided with a balance-weight above its fulcrum, and a stop, *h*, for the balance-lever *e*, substantially as set forth.

3. The combination of a differential-pressure valve consisting of a valve-seat, a valve-body having a bottom opening, a flexible diaphragm attached to said valve-body, a valve-spindle attached to the diaphragm and provided with a collar or lug for engaging the valve-body, and a fulcrumed weighted balance-lever connected to the upper end of the valve-spindle, a vessel inclosing said differential valve, a receiver or storage-chamber, and pipes connecting said vessel and storage-chamber, substantially as set forth.

4. The combination of a differential-pressure valve, a vessel inclosing said valve, a storage-chamber provided with a plunger, pipes connecting the ends of said storage-chamber with the ends of said inclosing-vessel, and valved conduit-pipes communicating with said connecting-pipes, substantially as described.

5. The combination, with a valve having a flexible diaphragm attached to a movable part thereof, of an oscillatory weighted lever having a movement or stroke in which its center of gravity passes alternately to opposite sides of its fulcrum, said pivoted lever being connected on one side of its fulcrum with said valve, and a stop on the opposite side of the fulcrum of said lever, which stop engages said lever after its center of gravity has passed its fulcrum on the stop side, substantially as described.

In testimony that I claim the foregoing as my invention I have signed my name in presence of two subscribing witnesses.

ALEXANDER KAISER.

Witnesses:
B. ROI,
J. BRANDT.